Patented June 16, 1942

2,286,915

UNITED STATES PATENT OFFICE 2,286,915

MANUFACTURE OF ADERMIN

Richard Kuhn and Gerhard Wendt, Heidelberg, Germany, assignors to Winthrop Chemical Company, Inc., New York, N. Y., a corporation of New York No Drawing. Application March 30, 1940, Serial No. 327,030. In Germany April 13, 1939

14 Claims. (Cl. 260—297)

This invention relates to a process of preparing adermin and to an intermediate obtainable in this process.

In accordance with the present invention 2-methyl-3-alkoxy-4.5-bis-hydroxymethyl-pyridine which is an ether of adermin (vitamin B₆) and has been obtained from natural sources, is treated with a concentrated hydrobromic acid, whereupon simultaneously the two aliphatic hydroxyl groups are replaced by bromine and the alkoxy group is dealkylated to the hydroxy group. The 2-methyl-3-hydroxy-4.5-bis-bromomethyl - pyridine-hydrobromide thus formed may then further be converted into the 2-methyl-3-hydroxy-4.5-bis-hydroxymethyl-pyridine (adermin) by hydrolysis in the usual manner. The hydrolysis takes place already upon heat-treatment in aqueous solution; of course also dilute alkalis may be used for this purpose. The 2-methyl-3-hydroxy-4.5-bis-hydroxymethyl-pyridine thus obtainable is isolated from the reaction mixture advantageously by first removing the hydrobromic acid by means of basically reacting silver compounds, such as silver oxide and silver acetate; the insoluble silver bromide formed may thus readily be separated from the reaction mixture, so that the reaction product is obtained in a state free from inorganic salts. Since the said reactions take place very readily, our new process represents a simple way for converting the ethers of adermin into adermin itself.

The invention is illustrated by the following example without being restricted thereto:

Example 1 part by weight of 2-methyl-3-methoxy-4.5-bis-hydroxymethyl-pyridine is heated to boiling for a short time in 90 parts by weight of 66% hydrobromic acid. On cooling of the reaction mixture the 2-methyl-3-hydroxy-4.5-bis-bromomethyl-pyridine-hydrobromide precipitates in light yellow, solid crystals. After recrystallization from boiling water the compound melts at 217° C. while decomposing. 1.95 parts by weight of the hydrobromide are heated to boiling for a short time in 200 parts by weight of water. After cooling an aqueous solution of 3.12 parts by weight of silver acetate in 600 parts of weight of water is slowly added thereto. After centrifuging and washing the silver precipitate hydrogen sulfide is introduced into the filtrate. The aqueous solution is evaporated to dryness after filtration from the precipitate of silver sulfide eventually formed while adding 2-normal hydrochloric acid. The 2-methyl-3-hydroxy-4.5-bis-hydroxymethyl-pyridine-hydrochloride is thus obtained, which after recrystallization from a mixture of water and acetone forms crystals melting at 200–201° C. After well mixing the said crystals with crystals of adermin-hydrochloride no lowering of the melting point has been observed.

Instead of the 3-methoxy compound for instance the corresponding 3-ethoxy compound may be used as starting-material in the above reaction.

We claim:

1. The process which comprises reacting upon a 2-methyl-3-alkoxy-4.5-bis-hydroxymethyl-pyridine with a concentrated hydrobromic acid and subjecting the 2-methyl-3-hydroxy-4.5-bis-bromomethyl-pyridine-hydrobromide formed to hydrolysis to form the 2-methyl-3-hydroxy-4.5-bis-hydroxymethyl-pyridine.

2. The process which comprises reacting upon a 2-methyl-3-alkoxy-4.5-bis-hydroxymethyl-pyridine with an about 66% hydrobromic acid and subjecting the 2-methyl-3-hydroxy-4.5-bis-bromomethyl-pyridine-hydrobromide formed to hydrolysis to form the 2-methyl-3-hydroxy-4.5-bis-hydroxymethyl-pyridine.

3. The process which comprises reacting upon a 2-methyl-3-alkoxy-4.5-bis-hydroxymethyl-pyridine with a concentrated hydrobromic acid and subjecting the 2-methyl-3-hydroxy-4.5-bis-bromomethyl-pyridine-hydrobromide formed to hydrolysis by heating with water to form the 2-methyl-3-hydroxy-4.5-bis-hydroxymethyl - pyridine.

4. The process which comprises reacting upon a 2-methyl-3-alkoxy-4.5-bis-hydroxymethyl-pyridine with an about 66% hydrobromic acid and subjecting the 2-methyl-3-hydroxy-4.5-bis-bromomethyl-pyridine-hydrobromide formed to hydrolysis by heating with water to form the 2-methyl-3-hydroxy-4.5-bis-hydroxymethyl - pyridine.

5. The process which comprises reacting upon a 2-methyl-3-alkoxy-4.5-bis-hydroxymethyl-pyridine with an about 66% hydrobromic acid, subjecting the 2-methyl-3-hydroxy-4.5-bis-bromo - methyl-pyridine-hydrobromide formed to hydrolysis by heating with water to form the 2-methyl-3-hydroxy-4.5-bis-hydroxymethyl - pyridine and removing the hydrobromic acid from the mixture by treatment with a basically reacting silver compound.

6. Process as claimed in claim 1 in which 2-methyl-3-methoxy-4.5-bis-hydroxymethyl - pyridine is used as starting-material.

7. Process as claimed in claim 2 in which 2-methyl-3-methoxy-4.5-bis-hydroxymethyl - pyridine is used as starting-material.

8. Process as claimed in claim 3 in which 2-methyl-3-methoxy-4.5-bis-hydroxymethyl - pyridine is used as starting-material.

9. Process as claimed in claim 4 in which 2-methyl-3-methoxy-4.5-bis-hydroxymethyl - pyridine is used as starting-material.

10. Process as claimed in claim 5 in which 2-methyl-3-methoxy-4.5-bis-hydroxymethyl - pyridine is used as starting-material.

11. 2-Methyl-3-hydroxy-4.5-bis-bromomethyl - pyridine-hydrobromide.

12. In the process of preparing adermin the step which comprises subjecting 2-methyl-3-hydroxy-4.5-bis-bromomethyl-pyridine - hydrobromide to hydrolysis to form 2-methyl-3-hydroxy-4,5-bis-hydroxymethyl-pyridine.

13. In the process of preparing adermin the step which comprises subjecting 2-methyl-3-hydroxy-4.5-bis-bromomethyl-pyridine - hydrobromide to hydrolysis by heating with water to form 2-methyl-3-hydroxy-4.5-bis-hydroxymethyl-pyridine.

14. In the process of preparing adermin the steps which comprise subjecting 2-methyl-3-hydroxy-4.5-bis-bromomethyl-pyridine - hydrobromide to hydrolysis by heating with water to form 2-methyl-3-hydroxy-4.5-bis-hydroxymethyl-pyridine and removing the hydrobromic acid from the mixture by treatment with a basically reacting silver compound.

RICHARD KUHN.
GERHARD WENDT.